Jan. 16, 1962   C. B. STENVALL   3,016,899
SURGICAL INSTRUMENT
Filed Nov. 3, 1958   2 Sheets-Sheet 1
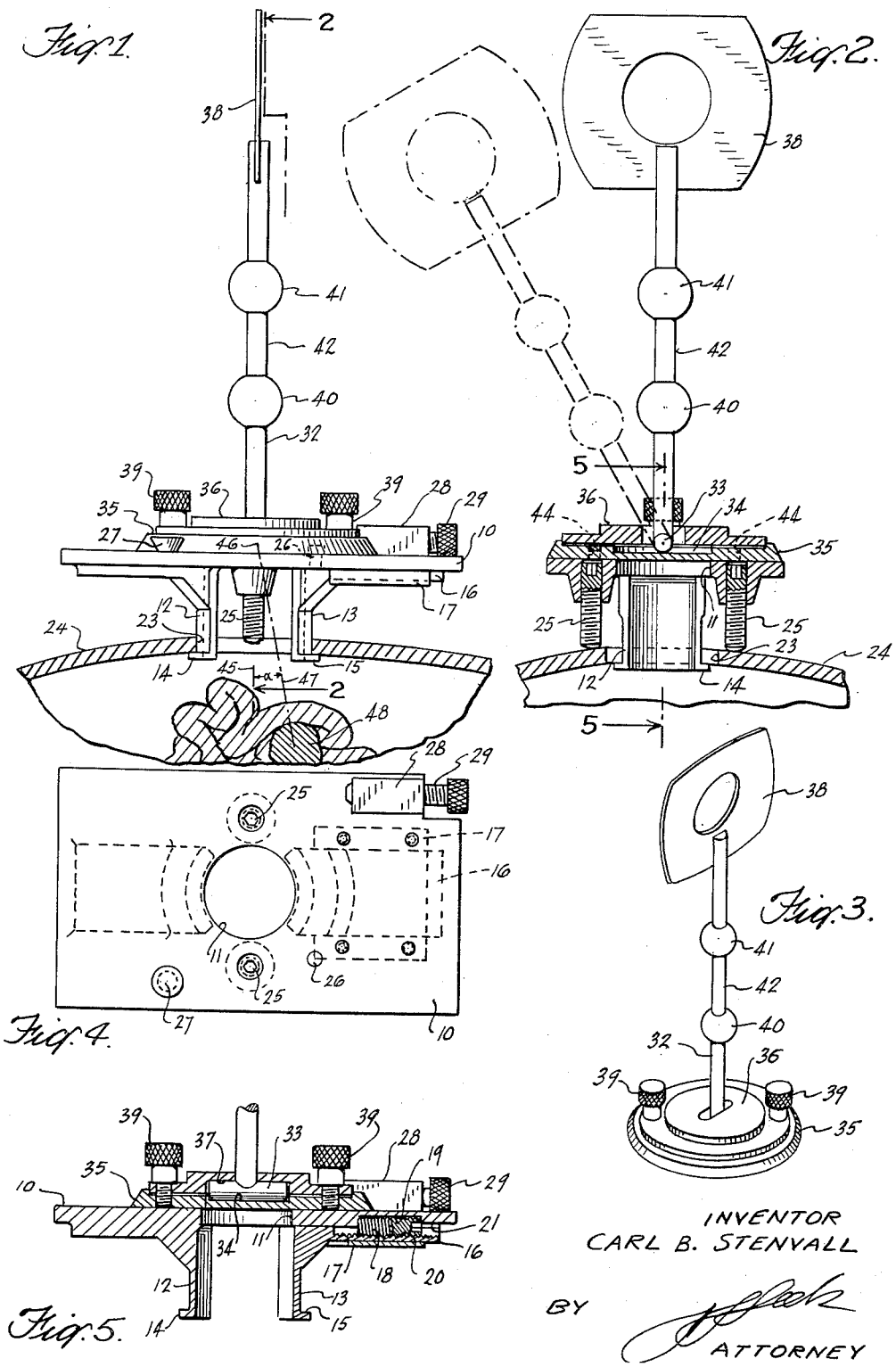
INVENTOR
CARL B. STENVALL
BY
ATTORNEY Jan. 16, 1962  C. B. STENVALL  3,016,899

SURGICAL INSTRUMENT

Filed Nov. 3, 1958  2 Sheets-Sheet 2

United States Patent Office 3,016,899
Patented Jan. 16, 1962

3,016,899
SURGICAL INSTRUMENT
Carl B. Stenvall, Portchester, N.Y.
(15 River St., New Rochelle, N.Y.)
Filed Nov. 3, 1958, Ser. No. 771,425
2 Claims. (Cl. 128—348)

This invention relates to surgical instruments and more particularly to an instrument for use in brain surgery wherein a tube or needle is to be inserted into a predetermined infected area of the brain.

An object is to provide a novel improved instrument of the above type.

Another object is to provide an instrument having means to determine accurately the angle at which the tube or needle is to be inserted.

Another object is to provide a guide which may be accurately adjusted to assure the insertion of a needle at any predetermined angle.

Another object is to provide a novel and improved indicator to be used in connection with an X-ray film for determining the precise angle at which the needle is to be inserted.

Various other objects and advantages will be apparent as the nature of the invention is more fully disclosed.

In brain surgery of the type to which the present instrument pertains the surgeon first drills a hole in the skull as close as feasible to the infected area. The object is then to pass a needle or a small plastic tube through the hole thus drilled in a direction such that the tip of the needle enters the infected brain area. If the area is to be treated over a period of time a fine plastic tube is disposed over the needle and inserted in this area. The needle is then withdrawn and the tube is used for the application of fluids to the aforesaid area.

In accordance with the present invention a platform is provided with a clamp which is insertable through the hole thus drilled by the surgeon and clamped against the skull to provide a fixed and rigid support for the elements to be described.

A pedestal carrying a marker disc is then affixed to the support. The pedestal is arranged to extend normal to the support and the marker disc is disposed in the plane at which an X-ray picture is to be taken.

With the support and marker disc in place the patient is placed over the X-ray film and so adjusted with respect to the film that an edge view of the marker disc is obtained thereby indicating that the picture is being taken in the proper plane.

After this picture has been taken the angle between an extension of the axis of the pedestal and a line drawn through the infected area is determined. This may be designated as the angle alpha.

The above procedure is then repeated with the marker disc rotated 90° so that the plane of the second X-ray picture is displaced by exactly 90° from the plane of the first X-ray picture and a similar angle from the infected area, designated on the angle beta is determined on this second picture.

After the above determinations have been made the pedestal and marker disc are removed from the platform and the needle guide is inserted. The needle guide consists of a pair of members each adjustable over a quadrant and disposed at angles of 90° with respect to each other. One of these members is set with the measured angle alpha and the other member is set with the measured angle beta. The guide is then in exact alignment with the infected area. A needle or a tube backed by a needle is then inserted in the instrument guide and is pushed into the affected area. The needle may then be removed, the tube secured in place by stitching, and the instrument and platform removed from the patient's skull. The tube is now temporarily secured and may be used for the injection of fluids for the treatment of the infected area.

The features of the invention will be better understood by referring to the following description taken in connection with the accompanying drawings forming a part thereof in which a specific embodiment has been set forth for purposes of illustration.

In the drawings:

FIG. 1 is a front elevation of the instrument showing the marker disc in vertical position and a portion of the skull in section;

FIG. 2 is a vertical section taken on the line 2—2 of FIG. 1;

FIG. 3 is a perspective view of the marker disc on a reduced scale;

FIG. 4 is a plan view of the base with the marker disc removed;

FIG. 5 is a vertical section taken on the line 5—5 of FIG. 2 with the upper part of the disc broken away;

Figure 6:
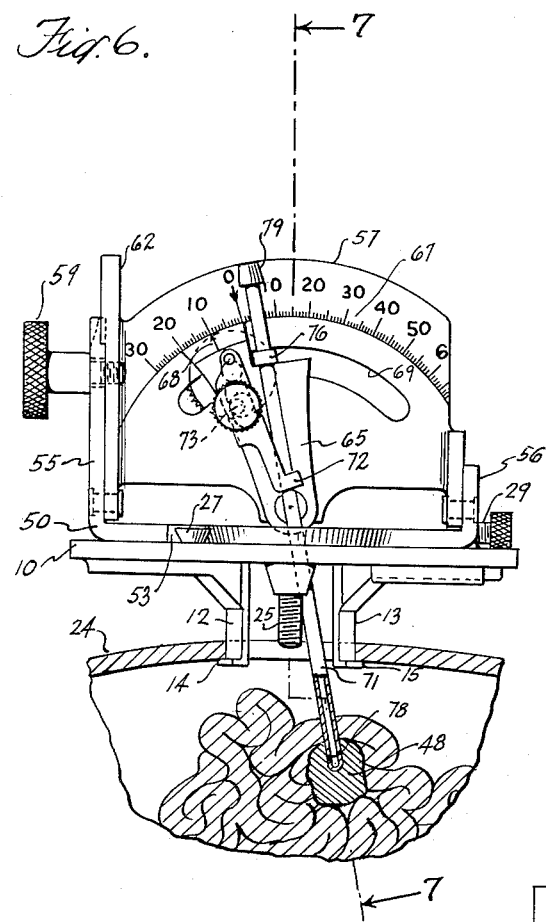
FIG. 6 is an elevation showing the needle guide in place with the skull in section and the treating tube inserted into position in the infected area.

Referring to the drawings more in detail the instrument is shown as comprising a platform 10 having a hole 11 therein and having depending from its lower surface a pair of clamps 12 and 13 conforming in shape to the periphery of the hole 11 and having lower outwardly turned flanges 14 and 15 respectively. The clamp 12 is rigidly secured to the base 10. The clamp 13 is provided with a horizontal flange 16 which is slidably secured to base 10 by means of a plate 17. For actuating the flange 16 there is provided a screw 18 which is seated and secured in a semi-circular recess 19 in the base 10 and engages a threaded semi-circular recess 20 formed in the flange 16. The base 10 is formed with a groove 21 which registers with the end of the screw 18 and is adapted to permit the insertion of a screwdriver or the like for turning the screw for the purpose of adjusting the sliding clamp 13. In use the clamps 12 and 13 are inserted through a hole 23 which is formed in the skull 24 and the sliding clamp 13 is adjusted by means of the screw 18 to tighten the clamp so as to rigidly secured the same to the skull. A pair of screws 25 are provided on opposite sides of the hole 11 and are adapted to be adjusted to contact the upper surface of the skull for steadying the platform and holding the same rigidly in place. On its upper surface the base 10 carries a positioning lug 26, a clamping lug 27, and a boss 28 in which the set screw 29 is secured for the purpose to be described.

A pedestal 32 carries at its lower end a pin 33 which is seated in a suitable recess 34 in a base 35 and secured by a plate 36 having a cooperating recess 37 and attached by screws 39 to the base 35 and is adapted to permit the pedestal 32 to pivot about the axis of the pin 33. The pedestal 32 carries at its upper end an indicator disc 38 which lies in a plane normal to the axis of the pin 33 in which plane the disc 38 and the pedestal 32 are normal to the plane of the base 35. A pair of balls 40 and 41 separated by a sleeve 42 are disposed on the pedestal 32 at a distance such that the center of the lower ball 40 is exactly midway between the center of the upper ball 41 and the axis of the pin 33. The under surface of the base 35 is provided with a pair of recesses 44 which are adapted to engage the positioning lug 26 on the base 10. With one of the recesses 44 so positioned the base 35 is clamped against the clamping lug 27 by means of the set screw 29 for holding the base 35 securely in position on the platform 10. The recesses 44 are disposed 90° apart with respect to the base 35 so that the plane of the disc 38 is rotated by 90° when the base 35 is shifted on the platform 10 from one positioning recess 44 to the other.

In the operation of the device thus far described, with the platform 10 secured in the skull of the patient and the pedestal 32 secured in place on the platform 10, the patient is so positioned with respect to the X-ray camera that a picture is taken in the plane of the disc 38. With the disc 38 properly positioned, the edge of the disc will appear in such a picture. Hence the edge of the disc is used as a guide to determine the angle in which the picture must be taken.

With the patient in position for taking the X-ray picture the pedestal 32 is shifted about the axis of the pin 33 so that the pedestal extends substantially parallel to the film, thereby preventing the image of the balls 40 and 41 from being foreshortened in the photograph. The picture thus taken is generally indicated in FIG. 1. To determine the angle alpha a line 45 is drawn which is an extension of the axis of the pedestal 32. The distance between the centers of the balls 40 and 41 on the picture is then measured downwardly from the lowermost ball 40 to determine the apex 46 of the angle alpha. A line 47 is then drawn from the point 46 through the infected area 48 of the brain, the position of which is known to the surgeon. The angle alpha between the lines 45 and 47 is then measured.

The set screw 29 is now loosened and the base 35 shifted by 90° to thereby rotate the plane of the disc 38 by 90°. The base 35 is clamped in place on the platform 10 and the same procedure is repeated to determine and measure the angle beta passing through the affected area in the second plane.

Figure 7:
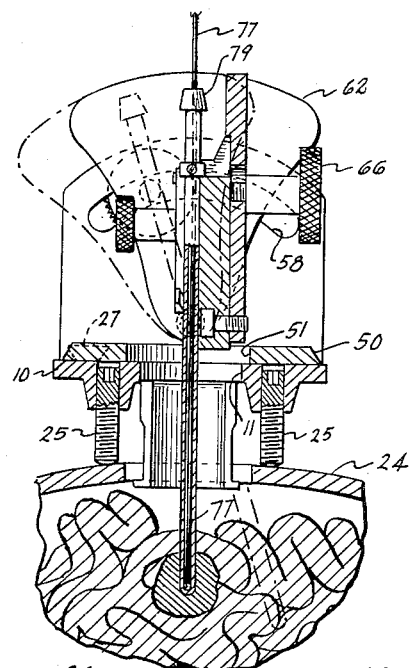
FIG. 7 is a vertical section taken on the line 7—7 of FIG. 6.
Figure 9:
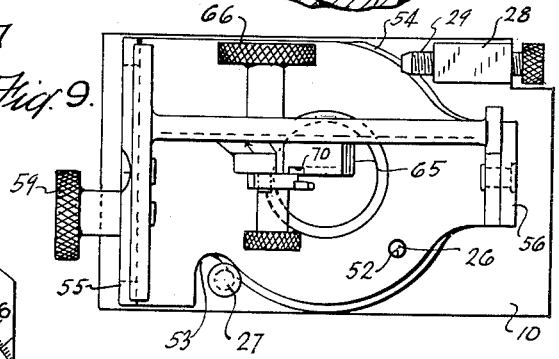
FIG. 9 is a plan view of the instrument.
Figure 8:
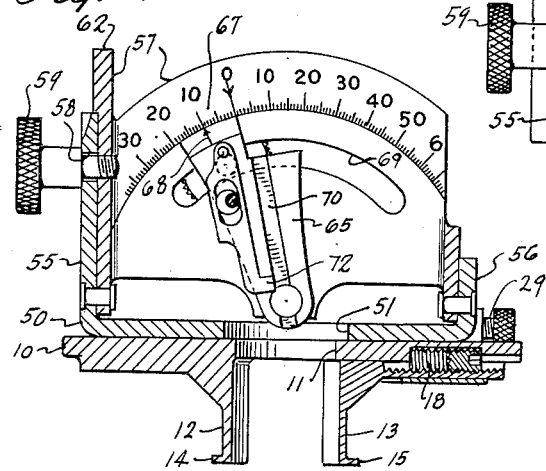
FIG. 8 is a front elevation similar to FIG. 6 with parts in vertical section.
Figure 10:
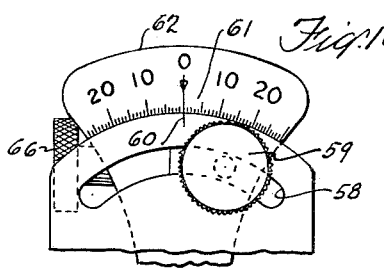
FIG. 10 is an end elevation looking from the left in FIG. 6.

The base 35 and pedestal 32 are now removed from the platform 10 and the guide instrument to be described is positioned on this platform. The guide instrument as as shown in FIGS. 6 to 10 comprises a base 50 having a central opening 51 therein adapted to register with the hole 11 in the platform 10 and having a recess 52 adapted to register with the positioning lug 26 on the platform 10. The base 50 is also provided with a slot 53 adapted to engage and be positioned by the lug 27 and has a beveled peripheral surface 54 adapted to be engaged by the set screw 29 for securing the base 50 to the platform 10.

The base 50 carries at its ends upwardly extending flanges 55 and 56 to which is pivoted a bracket 57 for pivotal movement about an axis which intersects the opening 51 and corresponds in position to the axis of the pin 33 in the pedestal 32. The flange 55 carries an arcuate groove 58 through which a set screw 59 extends. The set screw 59 is threaded in the bracket 57 and is adapted to clamp the bracket in any selected pivotal position with respect to the base 50 when the set screw 59 is tightened. The flange 55 is provided with an index mark 60 registering with a scale 61 carried on a flange 62 attached to the bracket 57. The bracket 57 is adapted to be set so that the angle indicated on the scale 61 conforms to the measured angle alpha.

A guide bar 65 is pivoted to the bracket 57 and is provided with a set screw 66 extending through an arcuate slot 69 in the bracket 57 for adjustably securing the guide in any angular position with respect thereto. The bracket 57 carries a scale 67 and the guide 65 is provided with an index mark 68 which is adapted to be set on the scale 67 in accordance with the measured angle beta.

The guide 65 is pivoted centrally of the axis of the opening 51 in the base 50 at a point conforming to the position of the axis of the pin 33. The guide 65 is provided with a slot 70 which is adapted to receive a tube 71 to be inserted. An adjustable clamp 72 is pivoted to the guide 65 and is shiftable by an eccentric pin 73 to overlie the slot 70 for clamping the tube 71 in position or to be removed from registration with the slot 70 for releasing the tube.

When the guide instrument is in place on the platform 10 as above described and the bracket 57 and guide 65 are set in accordance with the angles alpha and beta the slot 70 should be aligned precisely with the infected area 48 into which the tube is to be inserted. The tube 71 is now clipped in the slot 70, the distance which the tube is to be inserted is measured precisely and a clamp 76 is secured to the tube in a position to form a slot when clamp 76 engages the end of the guide 65. A stiffening needle 77 is now inserted in the tube 71 and the tube pushed into the brain tissue along the slot 70 until the clamp 76 engages the guide member 65. The needle 77 is now removed leaving the tube 71 in place. The tube 71 is formed with an opening 78 at its lower end and with a flange 79 at its upper end for coupling to a syringe or the like for the injection of a fluid. The clamp 72 is now shifted by the eccentric screw 73 to clamp the tube 71 in place and the tube is sewn to the skin tissues by the surgeon after which the clamp 72 is released. The set screw 29 is then released and the guide instrument is removed from the platform 10. The slide clamp 13 of the platform 10 is then released by turning the screw 18 and the platform is removed from the skull leaving the tube 71 in place.

Although a specific embodiment of this invention has been shown for purposes of illustration it is to be understood that the invention may be embodied in various forms as will be readily apparent to a person skilled in the art.

What is claimed is:

1. A surgical instrument for use in brain surgery wherein a tube or the like is to be inserted through an opening in the skull into a predetermined area of the brain, comprising a platform having an opening therein, clamps carried by said platform and disposed on opposite sides of said opening and adapted to be inserted in said skull opening, means spreading said clamps for gripping said skull, a base, means clamping said base to said platform, a bracket pivotally mounted on said base, guide means including an indicator for adjusting said bracket to a predetermined angular position with respect to said base, a guide member pivoted to said bracket for adjustment about an axis normal to the axis of said bracket, means including an indicator for adjusting said guide member to a predetermined angular position with respect to said bracket for thereby aligning said guide member with said predetermined brain area, said guide member being adapted to slidably hold said tube for insertion therealong through said opening into said predetermined area, and means associated with said guide member to clamp said tube thereon.

2. A surgical instrument for use in brain surgery wherein a tube or the like is to be inserted through an opening in the skull into a predetermined area of the brain, comprising a platform having an opening therein, clamps carried by said platform disposed on opposite sides of said opening and adapted to be inserted in said skull opening, means spreading said clamps for gripping said skull, a base, a base clamp on said platform removably clamping said base to said platform, a pedestal having a marker disc mounted on said base for pivotal movement in the plane of said marker disc about an axis in the plane of said base, upper and lower indicator means disposed on said pedestal with said lower indicator means midway between said upper indicator means and said axis whereby the location of said axis on a projection of said pedestal can be determined by measurement, said base having means cooperating with said base clamp for positioning said base on said platform in selected positions relatively displaced by 90° about the axis of said pedestal.

References Cited in the file of this patent

UNITED STATES PATENTS

| | | |
|---|---|---|
| 1,400,616 | McCrory et al. | Dec. 20, 1921 |
| 2,697,433 | Zehnder | Dec. 21, 1954 |

FOREIGN PATENTS

| | | |
|---|---|---|
| 820,618 | France | Aug. 2, 1937 |